(12) United States Patent
Joussellin et al.

(10) Patent No.: US 10,066,430 B2
(45) Date of Patent: Sep. 4, 2018

(54) SLIDING CLOSING ELEMENT, IN PARTICULAR A SLIDING DOOR OR A SLIDING WINDOW, FOR A SLIDING CLOSING ELEMENT ARRANGEMENT OF A VEHICLE, IN PARTICULAR OF AN AIRCRAFT

(71) Applicant: AIRBUS HELICOPTERS DEUTSCHLAND GMBH, Donauworth (DE)

(72) Inventors: Fabrice Joussellin, Augsburg (DE); Aurelien Vayssiere, Niederschoenfeld Gt Feldheim (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 0 days.

(21) Appl. No.: 15/050,530

(22) Filed: Feb. 23, 2016

(65) Prior Publication Data

US 2016/0245006 A1    Aug. 25, 2016

(30) Foreign Application Priority Data

Feb. 24, 2015    (EP) ..................................... 15400009

(51) Int. Cl.
*E05F 11/00*    (2006.01)
*E05D 15/06*    (2006.01)
(Continued)

(52) U.S. Cl.
CPC ........ *E05D 15/0621* (2013.01); *B64C 1/1438* (2013.01); *E05D 13/006* (2013.01);
(Continued)

(58) Field of Classification Search
CPC . E05D 15/0621; E05D 15/28; E05D 15/0678; E05D 13/006; E05D 15/0643; B64C 1/1438; E06B 3/46; E05Y 2900/502
USPC .......................................................... 49/360
See application file for complete search history.

(56) References Cited

U.S. PATENT DOCUMENTS 3,131,892 A * 5/1964 Salmun ..................... B64C 1/14
244/129.5
5,289,615 A * 3/1994 Banks ................... B64C 1/1407
16/366
(Continued)

FOREIGN PATENT DOCUMENTS

JP    2014104813    6/2014

OTHER PUBLICATIONS

European Search Report for European Application No. 15400009, Completed by the European Patent Office on Jul. 6, 2015, 3 Pages.
(Continued)

*Primary Examiner* — Jerry E Redman
(74) *Attorney, Agent, or Firm* — Brooks Kushman P.C.

(57) ABSTRACT

A sliding closing element for a sliding closing element arrangement of a vehicle, the sliding closing element arrangement comprising at least one rail that is adapted for slidably supporting the sliding closing element, the sliding closing element comprising at least one fail safe sliding arm assembly with at least one bogie support arm and at least one safety arm, the at least one bogie support arm comprising at least one bogie assembly with at least one guide roller that is adapted for rolling along the at least one rail in operation, and the at least one safety arm being adapted for retaining the at least one fail safe sliding arm assembly on the at least one rail in case of a failure of the at least one bogie support arm.

19 Claims, 8 Drawing Sheets

(51) Int. Cl.
  *B64C 1/14* (2006.01)
  *E05D 15/28* (2006.01)
  *E05D 13/00* (2006.01)
  *E06B 3/46* (2006.01)

(52) U.S. Cl.
  CPC ..... *E05D 15/0643* (2013.01); *E05D 15/0678* (2013.01); *E05D 15/28* (2013.01); *E06B 3/46* (2013.01); *E05Y 2900/502* (2013.01)

(56) References Cited

U.S. PATENT DOCUMENTS

| | | | | |
|---|---|---|---|---|
| 6,321,489 B1* | 11/2001 | Murofushi | ............... | B60J 5/062 49/360 |
| 6,328,374 B1* | 12/2001 | Patel | ................ | B60J 5/06 296/155 |
| 7,765,740 B2* | 8/2010 | Heuel | ................ | B60J 5/062 296/146.12 |
| 8,152,221 B2* | 4/2012 | Yoshioka | ................ | B60J 5/06 296/155 |
| 8,464,469 B2* | 6/2013 | Oberheide | ............ | E05F 15/646 296/155 |
| 8,701,348 B2* | 4/2014 | Ito | ................ | E05D 15/0621 49/213 |
| 9,016,762 B2* | 4/2015 | Ojima | ................ | B60J 5/047 296/155 |
| 2001/0022049 A1* | 9/2001 | Clark | ................ | B60J 5/06 49/360 |
| 2009/0133333 A1* | 5/2009 | Yokomori | ................ | B60J 5/06 49/360 |
| 2010/0059628 A1* | 3/2010 | Kobayashi | ............ | B64C 1/1438 244/129.5 |
| 2011/0089714 A1 | 4/2011 | Kitayama | | |
| 2015/0108275 A1* | 4/2015 | Pothier | ................ | E05B 77/36 244/129.5 |
| 2017/0113781 A1* | 4/2017 | Alfano | ................ | B64C 7/00 |

OTHER PUBLICATIONS

Notice of Reason for Refusal of Korean Application No. KR 10-2016-0021394 with English Translation; dated Jul. 19, 2017; 5 pages.

\* cited by examiner

SLIDING CLOSING ELEMENT, IN PARTICULAR A SLIDING DOOR OR A SLIDING WINDOW, FOR A SLIDING CLOSING ELEMENT ARRANGEMENT OF A VEHICLE, IN PARTICULAR OF AN AIRCRAFT

CROSS REFERENCE TO RELATED APPLICATION

This application claims priority to European patent application No. EP 15 400009.5 filed on Feb. 24, 2015, the disclosure of which is incorporated in its entirety by reference herein.

BACKGROUND OF THE INVENTION (1) Field of the Invention

The present invention is related to a sliding closing element, in particular a sliding door or a sliding window, for a sliding closing element arrangement of a vehicle, in particular of an aircraft. The present invention is further related to a sliding closing element arrangement of a vehicle, in particular of an aircraft. The present invention is further related to a vehicle, in particular an aircraft, comprising a sliding closing element arrangement with a sliding closing element, in particular a sliding door or a sliding window.

(2) Description of Related Art

Sliding closing elements in a vehicle, such as sliding doors or sliding windows, which are used to open or close corresponding apertures provided in the vehicle, are usually guided on the vehicle via suitable guide rails at a predetermined distance along an outer surface of the vehicle up to a height of a corresponding aperture provided in the vehicle, and are then guided into the aperture via suitably curved or bent ends of the guide rails. In general, such sliding closing elements must be moved manually from a corresponding opening position along the guide rails and must furthermore be locked manually in a corresponding closing position in the aperture of the vehicle.

Conventional sliding closing elements usually comprise one or more bogie support arms that are rigidly mounted to a plate-shaped support of the sliding closing element via an associated mounting plate by means of suitable fasteners, such as screws. If, for instance, the sliding closing element implements a sliding door, the one or more bogie support arms are e.g. rigidly mounted to a door leaf of this sliding door. Each one of the one or more bogie support arms supports one or more bogie assemblies with associated guide rollers that are adapted for rolling along a given guide rail in operation. The one or more bogie assemblies, i.e. the associated guide rollers, are adapted for engaging the given guide rail in an accommodation provided on or in the given guide rail.

In particular in aircrafts, sliding closing elements such as sliding doors or sliding windows are subject to very high aerodynamic forces during flight, which can lead to a loss of the sliding closing elements during flight, e.g. in case of a failure such as a rupture of the one or more bogie support arms thereof. However, it is clear that for safety reasons and according to applicable regulations, such as the EASA regulations, it is imperatively necessary to keep the sliding closing element on the aircraft under all circumstances, i.e. also in case of failure respectively rupture of the one or more bogie support arms thereof during flight.

Therefore, comparatively heavy bogie support arms for sliding closing elements in aircrafts have been developed to resist and to match with all flight conditions. Likewise, an underlying sizing of each part of a given bogie support arm associated with a sliding closing element can be increased, such as e.g. an underlying dimension of guide rollers of a bogie assembly or an underlying dimension of a connector beam that connects the bogie assembly to an associated mounting plate of the bogie support arm etc. In both cases an over-dimensioning of the bogie support arm as a whole arises.

However, due to such an over-dimensioning of each part and, consequently, of the bogie support arm as a whole, a resulting overall weight of the given bogie support arm is significantly increased compared to the conventional bogie support arm. Furthermore, in term of costs correspondingly required machining elements are very expensive with conventional solutions/configurations.

Moreover, it is not only forbidden, but also highly critical and dangerous to lose, for instance, a sliding closing element of an aircraft during flight, e.g. above a city or other plants. In addition, a sliding closing element that is lost during flight may e.g. collide with and, thus, potentially destroy an engine, a wing or a counter-torque device of a corresponding aircraft, thus endangering crew and passengers of this aircraft. This is not acceptable with today's EASA regulations.

BRIEF SUMMARY OF THE INVENTION

It is, therefore, an object of the present invention to provide a new sliding closing element for a vehicle, which is securely and reliably connected to the vehicle in all possible operating conditions thereof, and wherein an underlying probability for losing the sliding closing element that is connected to the vehicle in case of failure is at least essentially reduced to zero.

More specifically, according to the present invention a sliding closing element, in particular a sliding door or a sliding window, for a sliding closing element arrangement of a vehicle, in particular of an aircraft, wherein the sliding closing element arrangement comprises at least one rail that is adapted for slidably supporting the sliding closing element, comprises at least one fail safe sliding arm assembly with at least one bogie support arm and at least one safety arm. The at least one bogie support arm comprises at least one bogie assembly with at least one guide roller that is adapted for rolling along the at least one rail in operation. The at least one safety arm is adapted for retaining the at least one fail safe sliding arm assembly on the at least one rail in case of a failure of the at least one bogie support arm.

Advantageously, the fail-safe sliding arm assembly ensures and guarantees a safe and reliable positioning of the inventive sliding closing element on a rail of a sliding closing element arrangement in an associated vehicle for each operating condition and each possible failure situation. This fail safe sliding arm assembly moves with the sliding closing element during sliding and preferably grips the rail on two opposed longitudinal sides.

More specifically, the inventive safety arm of the fail-safe sliding arm assembly is always engaged behind the rail, i.e. between the rail and a chassis of the vehicle. Thus, in case of a rupture of the bogie support arm, the inventive safety arm retains the sliding closing element at the rail.

Advantageously, provision of the inventive safety arm allows manufacturing of the fail-safe sliding arm assembly with a reduced weight compared to the conventional, over-dimensioned and/or comparatively heavy bogie support arms described above, as a comparatively simple and lightweight bogie support arm can be used. Thus, applicable costs for the bogie support arm as such can already be restricted. Furthermore, the inventive safety arm can be realized as a comparatively inexpensive component, so that the overall manufacturing costs of the fail-safe sliding arm assembly are reduced compared to the conventional, over-dimensioned and/or comparatively heavy bogie support arms described above.

According to one aspect of the present invention, safety of the inventive sliding closing element is ensured during all case of movement, loads and problems that may occur in operation of an associated vehicle. The bogie support arm and the safety arm of the inventive fail safe sliding arm assembly are provided as two separate, independent components, which are fixed independently on the sliding closing element, preferably with different fasteners, and which are coupled to each other by means of a spacer and associated washers that provide for sufficient strength resistance in all cases and situations. These spacer and washers allow rotation of the inventive fail safe sliding arm assembly along the rail and position the safety arm relative to the rail, i.e. secure a predetermined positioning of the safety arm at the rail, so that the safety arm generally retains the sliding closing element on the rail, i.e. on the vehicle.

Preferably, the bogie support arm is realized as a conventional aluminum fitting that is assembled with the bogie assembly that comprises the guide rollers. The guide rollers preferentially roll inside the rail. In order to save weight and to avoid oversizing of the bogie support arm while respecting flight regulations and certification requirements, the safety arm is provided as a parallel fitting that is connected to the bogie support arm as described above by means of a specific junction between both arms using the spacer and washers.

According to a preferred embodiment of the invention, the at least one bogie assembly is adapted for engaging the at least one rail in an associated accommodation that is arranged on a first longitudinal side of the at least one rail.

According to a further preferred embodiment of the invention, the at least one safety arm is adapted for abutting against a second longitudinal side of the at least one rail. The second longitudinal side opposes the first longitudinal side of the at least one rail.

According to a further preferred embodiment of the invention, the at least one safety arm comprises at least one safety retainer that defines with the at least one bogie assembly a rail reception gap for reception of the at least one rail.

According to a further preferred embodiment of the invention, the at least one safety arm comprises at least one connector beam. The at least one safety retainer is rigidly mounted to the at least one connector beam with an associated mounting angle, preferably perpendicularly.

According to a further preferred embodiment of the invention, the at least one safety retainer and the at least one connector beam are implemented as an integrated, one-piece component.

According to a further preferred embodiment of the invention, the at least one connector beam comprises a mounting plate that is attached to a plate-shaped support of the sliding closing element.

According to a further preferred embodiment of the invention, the mounting plate and the at least one connector beam enclose a predetermined angle, preferably 90°.

According to a further preferred embodiment of the invention, the mounting plate is rigidly and removably attached to the plate-shaped support by means of associated fasteners.

According to a further preferred embodiment of the invention, the at least one bogie support arm and the at least one safety arm are interconnected by means of an associated coupling element. The associated coupling element is adapted to allow a rotation between the at least one bogie support arm and the at least one safety arm in case of a failure of the sliding closing element.

According to a further preferred embodiment of the invention, the at least one bogie support arm comprises at least one first connector beam and the at least one safety arm comprises at least one second connector beam. The at least one first and second connector beams are interconnected by means of the associated coupling element.

According to a further preferred embodiment of the invention, the associated coupling element comprises a spacer that defines a predetermined distance between the at least one first and second connector beams.

According to a further preferred embodiment of the invention, the at least one first connector beam is provided with at least one coupling plate that is connected to the at least one second connector beam by means of the associated coupling element.

The present invention further provides a sliding closing element arrangement of a vehicle, in particular of an aircraft. The sliding closing element arrangement comprises a sliding closing element, in particular a sliding door or a sliding window, and at least one rail that is adapted for slidably supporting the sliding closing element. The sliding closing element comprises at least one fail safe sliding arm assembly with at least one bogie support arm and at least one safety arm. The at least one bogie support arm comprises at least one bogie assembly with at least one guide roller that is adapted for rolling along the at least one rail in operation. The at least one safety arm is adapted for retaining the at least one fail safe sliding arm assembly on the at least one rail in case of a failure of the at least one bogie support arm.

The present invention further provides a vehicle, in particular an aircraft, comprising a sliding closing element arrangement with a sliding closing element, in particular a sliding door or a sliding window, and at least one rail that slidably supports the sliding closing element. The sliding closing element comprises at least one fail safe sliding arm assembly with at least one bogie support arm and at least one safety arm. The at least one bogie support arm comprises at least one bogie assembly with at least one guide roller that is adapted for rolling along the at least one rail in operation. The at least one safety arm is adapted for retaining the at least one fail safe sliding arm assembly on the at least one rail in case of a failure of the at least one bogie support arm.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
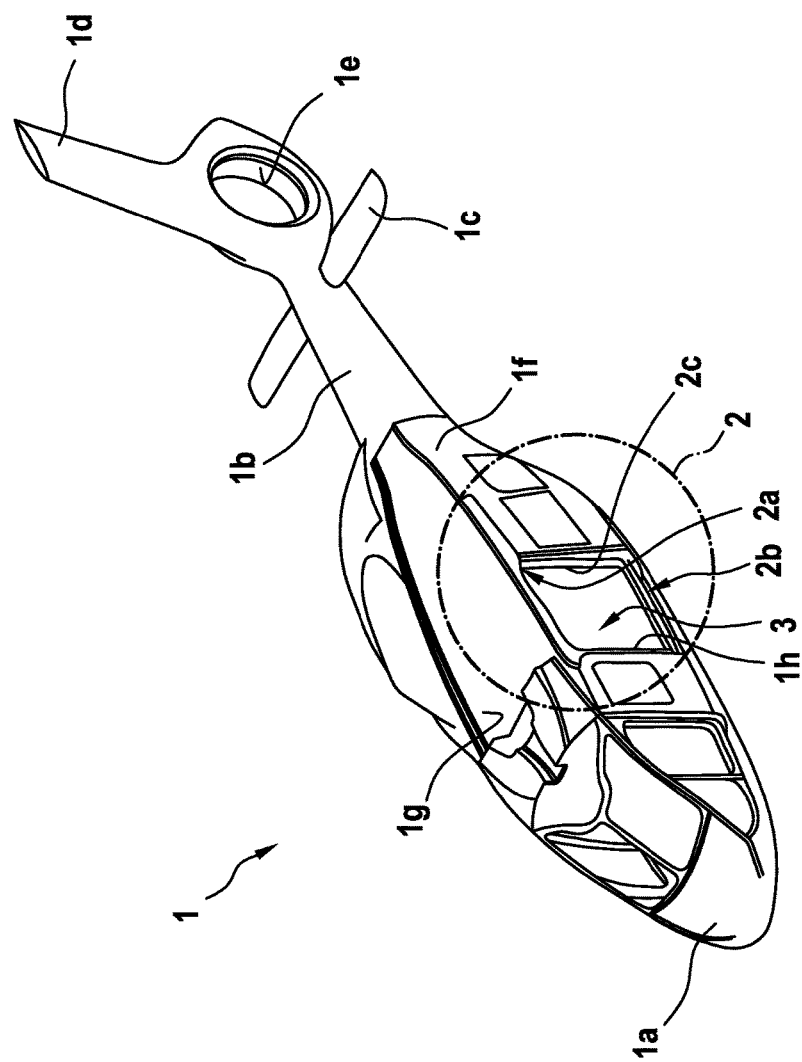
FIG. 1 shows a schematic view of a vehicle that is adapted to receive a sliding closing element arrangement according to the present invention.

FIG. 1 shows a vehicle 1 that is exemplarily illustrated as an aircraft, in particular as a rotary wing aircraft and, more particularly, as a helicopter. Thus, for purposes of simplicity and clarity, the vehicle 1 is hereinafter referred to as the "helicopter" 1. The present invention is, however, not limited to helicopters and can likewise be applied to any other vehicle, in particular to a vehicle that is controllable in a flowing medium, such as air or water, independent of a particular configuration thereof.

Illustratively, the helicopter 1 comprises a fuselage 1a that defines a tail boom 1b, which exemplarily comprises a tail wing 1c, a fin 1d and a shroud 1e for accommodation of a suitable counter-torque device, such as a tail rotor, which is configured to provide counter-torque during operation in order to balance the helicopter 1 in terms of yaw. The tail boom 1b may further be provided e.g. with a horizontal stabilizer, a bumper and so on.

It should be noted that only the fuselage 1a with the tail boom 1b are shown in FIG. 1 for purposes of simplicity and clarity of the drawings. However, other conventional components, such as e.g. a rotor and a landing gear of the helicopter 1, are not shown, as they are well-known to the person skilled in the art and not part of the present invention and would, thus, only unnecessarily encumber and complicate the representation.

Illustratively, the fuselage 1a comprises at least two longitudinal side walls, a board side wall 1f and a starboard side wall 1g, both of which are preferably connected to the tail boom 1b. The fuselage 1a preferably defines at least a cockpit, as well as a passenger cabin and/or a cargo compartment. However, for simplicity and clarity of the description, such a cockpit, passenger cabin and cargo compartment are not explained in greater detail.

According to one aspect of the present invention, at least the board side wall 1f is provided with a sliding closing element region 2, wherein a sliding closing element arrangement with at least one upper and at least one lower rail arrangement 2a, 2b can be arranged. Illustratively, the upper and lower rail arrangements 2a, 2b are attached to the fuselage 1a.

More specifically, the upper and lower rail arrangements 2a, 2b are preferably adapted for slidably receiving a sliding closing element, which in turn is adapted for opening or closing an aperture 1h provided in the sliding closing element region 2 of the board side wall 1f, preferably sealingly. By way of example, the aperture 1h is equipped with a frame 2c.

Figure 2:
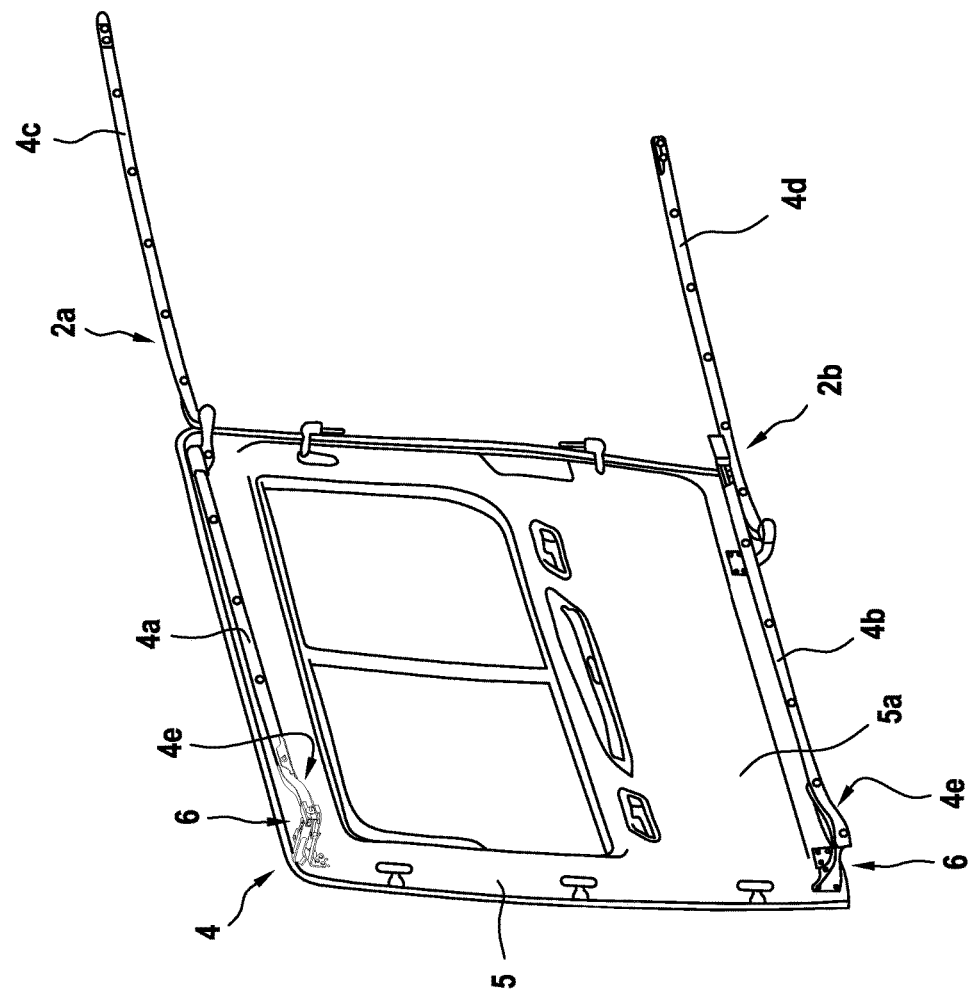
FIG. 2 shows a perspective view of a sliding closing element arrangement with an upper rail and a fail-safe sliding arm assembly according to the present invention.

According to one aspect of the present invention, the starboard side wall 1g is also provided with a sliding closing element region 2, wherein at least one upper and at least one lower rail arrangements 2a, 2b are attached to the fuselage 1a and wherein an aperture 1h is provided for reception of a sliding closing element. More specifically, the starboard side wall 1g is preferably provided with a sliding closing element arrangement, such as the sliding closing element arrangement 4 of FIG. 2, which is shown in FIG. 2 seen in a viewing direction 3 of FIG. 1. However, for purposes of simplicity and clarity of the drawings, the sliding closing element region 2 of the starboard side wall 1g is not illustrated in greater detail.

FIG. 2 shows a sliding closing element arrangement 4 according to the present invention, which is seen in the viewing direction 3 of FIG. 1 and exemplarily adapted for being mounted to the starboard side wall 1g of the helicopter 1 of FIG. 1. The sliding closing element arrangement 4 illustratively comprises the upper and lower rail arrangements 2a, 2b of FIG. 1, which are preferably attached to the starboard side wall 1g of the helicopter 1 of FIG. 1 by means of suitable fasteners, such as screws, bolts, rivets and so on.

According to one aspect, the upper rail arrangement 2a comprises an upper rail front section 4a and an upper rail rear section 4c. Likewise, the lower rail arrangement 2b comprises a lower rail front section 4b and a lower rail rear section 4d. The upper and lower rail front sections 4a, 4b are preferably respectively provided with curved end sections 4e and attached to the fuselage 1a of FIG. 1 in the region of the frame 2c provided in the aperture 1h of the starboard side wall 1g of the helicopter 1 of FIG. 1, while the upper and lower rail rear sections 4c, 4d are preferably attached to the fuselage 1a of FIG. 1 at a position downstream of the frame 2c, seen in forward flight direction of the helicopter 1 of FIG. 1.

As described above with reference to FIG. 1, the upper and lower rail arrangements 2a, 2b are adapted for slidably supporting a sliding closing element 5 that is provided for opening or closing the aperture 1h of the starboard side wall 1g of the helicopter 1 of FIG. 1, preferably sealingly. According to one aspect, the sliding closing element 5 comprises at least one plate-shaped support 5a.

The sliding closing element 5 is illustratively embodied as a sliding door and, consequently, the plate-shaped support 5a e.g. as a door leaf. Therefore, the sliding closing element 5 is also referred to as the "sliding door 5" and the plate-shaped support 5a as the "door leaf 5a" hereinafter, for simplicity and clarity. Accordingly, the sliding closing element arrangement 4 is also referred to as the "sliding door arrangement 4" hereinafter, for simplicity and clarity.

However, it should be noted that the present invention is not restricted to sliding door arrangements and that other sliding closing element arrangements are also contemplated. For instance, the sliding closing element 5 may alternatively be embodied as a sliding window, so that the sliding closing element arrangement 4 defines a sliding window arrangement. Alternatively, the sliding closing element 5 may simply be a sliding panel in general, so that the sliding closing element arrangement 4 defines a sliding panel arrangement, and so on.

It should further be noted, that the present invention is not restricted to a helicopter having two sliding door arrangements. Instead, any vehicle having one or more sliding door arrangements, one or more sliding window arrangements or one or more sliding panel arrangements is likewise contemplated. Furthermore, any vehicle having any combination of one or more sliding door arrangements with one or more sliding window arrangements and/or one or more sliding panel arrangements is also contemplated.

According to one aspect of the present invention, the sliding door 5 is equipped with at least one fail safe sliding arm assembly 6 that is adapted for enabling a sliding movement of the sliding door 5 along the upper and lower rail arrangements 2a, 2b. Preferably, the sliding door 5 is equipped with at least one fail safe sliding arm assembly 6 on its upper side, i.e. in the region of the upper rail arrangement 2a, and with at least one fail safe sliding arm assembly 6 on its lower side, i.e. in the region of the lower rail arrangement 2b. These fail safe sliding arm assemblies 6 preferentially comprise at least similar constructions, which may of course vary within usual predetermined manufacturing tolerances, so that only the at least one fail safe sliding arm assembly 6 that is arranged on the upper side of the sliding door 5, i.e. in the region of the upper rail arrangement 2a, is described in greater detail in the following. For simplicity and clarity, this at least one fail safe sliding arm assembly 6 is referred to as the "upper fail safe sliding arm assembly 6" hereinafter.

Figure 3:
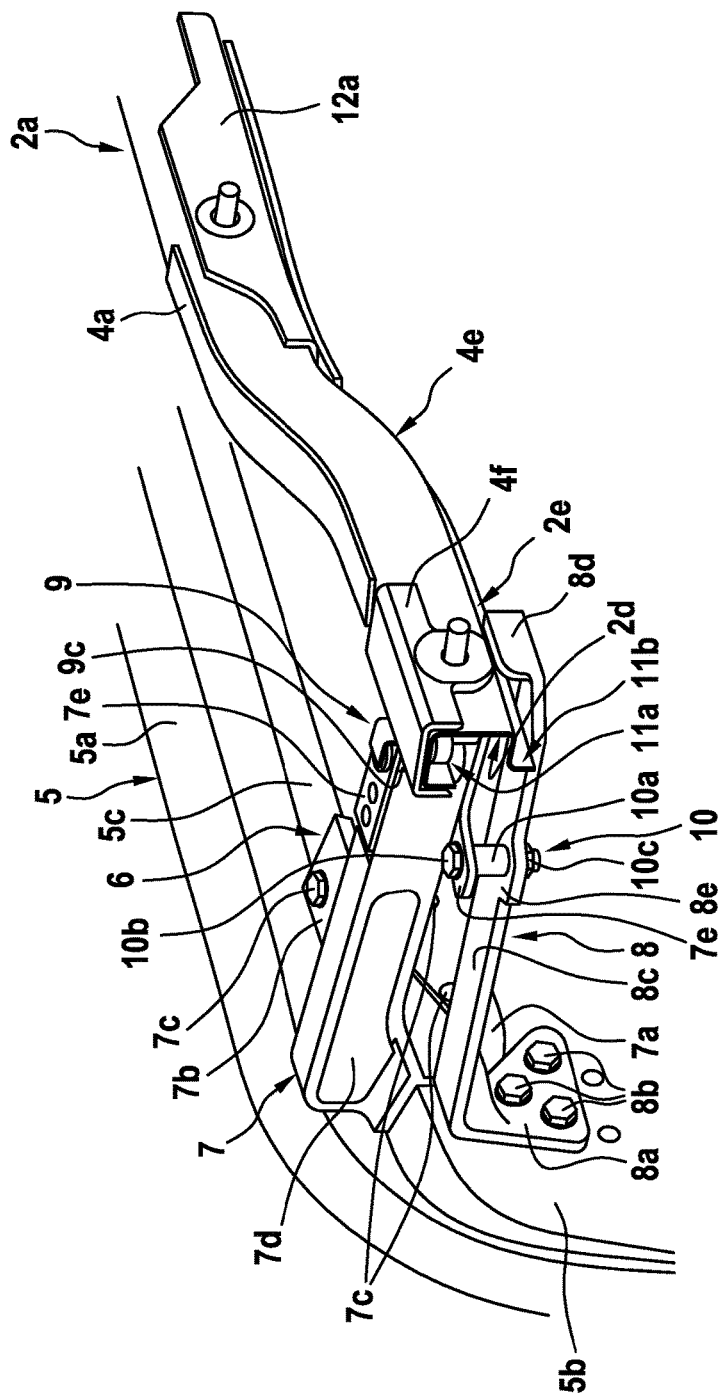
FIG. 3 shows a detail of the fail-safe sliding arm assembly of FIG. 2 in a front-top side perspective view.

FIG. 3 shows the sliding door 5 of FIG. 2 with the upper fail safe sliding arm assembly 6 of FIG. 2, which is slidably arranged on the upper rail arrangement 2a of FIG. 1 and FIG. 2. Illustratively, the sliding door 5 is shown in a closing position, wherein the upper fail safe sliding arm assembly 6 is positioned at a front axial end of the curved end section 4e of the upper rail front section 4a of the upper rail arrangement 2a, seen in forward flight direction of the helicopter 1 of FIG. 1. This front axial end of the curved end section 4e of the upper rail front section 4a is preferably attached to the fuselage 1a of the helicopter 1 of FIG. 1 by means of an associated fixation element 4f.

According to one aspect of the present invention, the upper fail safe sliding arm assembly 6 comprises at least one bogie support arm 7 and at least one safety arm 8. Preferably, the bogie support arm 7 and the safety arm 8 are interconnected by means of an associated coupling element 10 that is adapted to allow a rotation between the bogie support arm 7 and the safety arm 8 in case of a failure of the sliding door 5 and, in particular, in case of a rupture of the bogie support arm 7. This coupling element 10 introduces efforts and strength for different scenarios and along all movement of the sliding door 5.

The bogie support arm 7 can be embodied as a conventional, not-oversized aluminum fitting with a comparatively high strength, and comprises at least one bogie assembly 9 that is adapted for engaging the upper rail arrangement 2a in an associated accommodation 11a. The latter is preferentially arranged on a first, outer longitudinal side 2d of the upper rail arrangement 2a, which points away from the helicopter 1 of FIG. 1.

According to one aspect of the present invention, the bogie assembly 9 comprises a guide roller mount 9c. The latter is preferably rigidly mounted to at least one connector beam 7d of the bogie support arm 7, preferably by means of one or more associated coupling plates 7e and fasteners (9d in FIG. 5).

More specifically, the connector beam 7d is preferentially bar-shaped and one of its axial ends is connected to the guide roller mount 9c via an upper and a lower coupling plate 7e. Its other axial end is connected to at least one mounting plate, which is at least rigidly attached to the connector beam 7d and preferably integral to the connector beam 7d, i.e. forms a one-piece component therewith. Illustratively, the connector beam 7d is provided with two mounting plates 7a, 7b, which exemplarily form an L-shaped mounting component. The latter is arranged on the door leaf 5a of the sliding door 5 such that the mounting plate 7a abuts against an inner surface 5b of the door leaf 5a, while the mounting plate 7b abuts against an inner attachment ledge 5c provided on the door leaf 5a. Preferably, the mounting plates 7a, 7b are rigidly and removably attached to the inner surface 5b and the inner attachment ledge 5c of the door leaf 5a by means of suitable fasteners 7c, such as screws, bolts, rivets and so on. This allows an easy and quick replacement of the bogie support arm 7, if required.

According to one aspect of the present invention, the inner surface 5b of the door leaf 5a is also connected with the safety arm 8, which is preferably adapted for retaining the upper fail safe sliding arm assembly 6 on the upper rail arrangement 2a in case of a failure, such as a rupture, of the bogie support arm 7. The safety arm 8 preferably comprises at least one preferentially bar-shaped connector beam 8c and is equipped with a mounting plate 8a. The latter is rigidly and removably attached to the door leaf 5a of the sliding door 5, i.e. to its inner surface 5b. This allows an easy and quick replacement of the safety arm 8, if required.

More specifically, the mounting plate 8a and the connector beam 8c are preferably implemented as an integrated, one-piece component and enclose a predetermined angle, which preferentially comprises at least approximately 90°. The mounting plate 8a is attached to the inner surface 5b of the door leaf 5a by means of suitable fasteners 8b, such as screws, bolts, rivets and so on.

According to one aspect of the present invention, the safety arm 8 is preferably adapted for abutting against a second, inner longitudinal side 2e of the upper rail arrangement 2a, which preferentially opposes the outer longitudinal side 2d of the upper rail arrangement 2a. In other words, the inner longitudinal side 2e preferably faces the fuselage 1a of the helicopter 1 of FIG. 1.

More specifically, for retaining the upper fail safe sliding arm assembly 6 on the upper rail arrangement 2a in case of a failure, such as a rupture, of the bogie support arm 7, the safety arm 8 preferably comprises at least one safety retainer 8d that defines with the bogie assembly 9 of the bogie support arm 7 a rail reception gap 6a for reception of the upper rail arrangement 2a. The safety retainer 8d is at least rigidly mounted to the connector beam 8c with an associated mounting angle, preferentially perpendicularly. Preferably, the safety retainer 8d and the connector beam 8c are implemented as an integrated, one-piece component.

The safety retainer 8d preferentially engages respectively abuts against a safety retainer blocking element 11b provided at the upper rail arrangement 2a. Illustratively, this safety retainer blocking element 11b is implemented as a fold on the upper rail arrangement 2a.

According to one aspect of the present invention, the connector beam 8c is connected to the connector beam 7d of the bogie support arm 7 by means of the associated coupling element 10, thus, interconnecting the safety arm 8 and the bogie support arm 7 as described above. More specifically, the coupling element 10 preferably interconnects the lower coupling plate 7e of the bogie support arm 7 to the connector beam 8c of the safety arm 8 by means of the associated coupling element 10, wherein the connector beam 8c can be provided with an optional reinforcement in the region of the associated coupling element, such as a lateral extension 8e.

Preferably, the coupling element 10 comprises at least one spacer 10a that defines a predetermined distance between the connector beams 7d, 8c of the bogie support arm 7 and the safety arm 8. The spacer 10a is preferentially embodied as a sleeve or a washer that is firmly held in position between the lower coupling plate 7e of the bogie support arm 7 and the connector beam 8c of the safety arm 8 by means of a suitable fixation element 10b and associated fixation means 10c, such as a screw and an associated screw nut. Preferentially, the coupling element 10 is arranged at a position that is closer to the upper rail arrangement 2a than to the door leaf 5a of the sliding door 5.

According to one aspect of the present invention, the upper rail arrangement 2a comprises one or more rail mounting reinforcements that are adapted for reinforcing the upper rail arrangement 2a in potential failure areas, where comparatively high aerodynamic forces may act on the upper rail arrangement 2a in operation. By way of example, one rail mounting reinforcement 12a is provided in an area of the upper rail arrangement 2a, where the curved end section 4e of its upper rail front section 4a migrates into a straight section leading to its upper rail rear section 4c of FIG. 2. Preferably, the rail mounting reinforcement 12a has a contour respectively outer shape that corresponds to the contour respectively outer shape of the upper rail front section 4a, so that no modification of the upper rail front section 4a is required when using the rail mounting reinforcement 12a.

Figure 4:
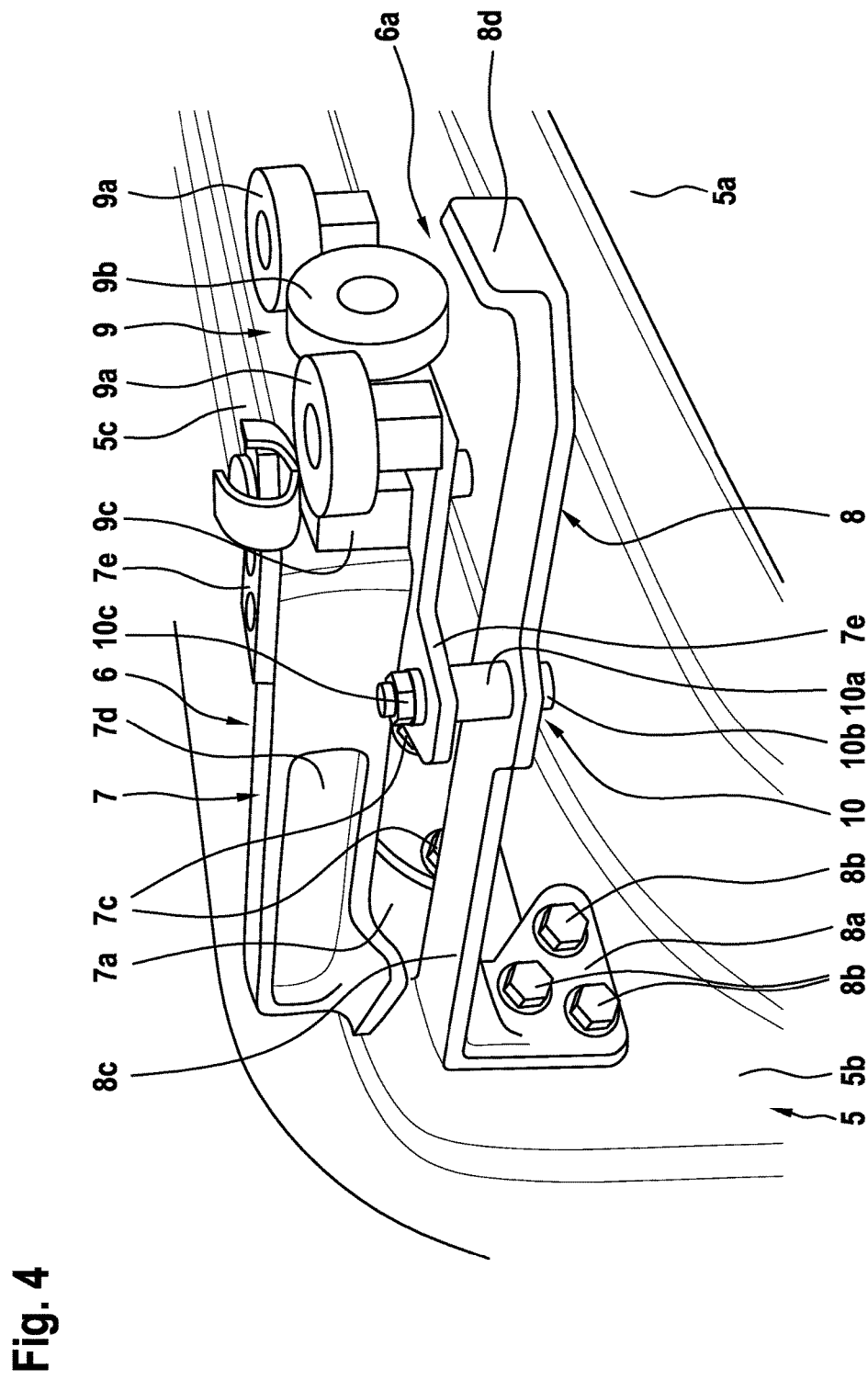
FIG. 4 shows a further detail of the fail-safe sliding arm assembly of FIG. 3 in a front-top side perspective view.

FIG. 4 shows the sliding door 5 of FIG. 3 with the upper fail safe sliding arm assembly 6 of FIG. 3, which comprises the safety arm 8 and the bogie support arm 7 with the bogie assembly 9 that comprises the guide roller mount 9c of FIG. 3. The latter is provided with at least one and illustratively three guide rollers 9a, 9b.

More specifically, two horizontal guide rollers 9a are provided, which exemplarily comprise rotation axes that are perpendicular to a longitudinal axis of the connector beam 7d of the bogie support arm 7. Furthermore, one vertical guide roller 9b is provided with a rotation axis that is at least parallel and preferably coaxial to the longitudinal axis of the connector beam 7d.

In particular, FIG. 4 further illustrates the connection of the guide roller mount 9c to the beam connector 7d by means of the upper and lower coupling plates 7e of the bogie support arm 7, as well as the coupling of the lower coupling plate 7e to the safety arm 8. Furthermore, the rail reception gap 6a that is embodied between the safety retainer 8d of the safety arm 8 and the bogie assembly 9, i.e. the guide rollers 9a, 9b of the bogie support arm 7 for reception of the upper rail arrangement 2a of FIG. 3, is further illustrated. Moreover, the spacer 10a of the coupling element 10 arranged between the safety arm 8 and the bogie support arm 7 is further illustrated.

Figure 5:
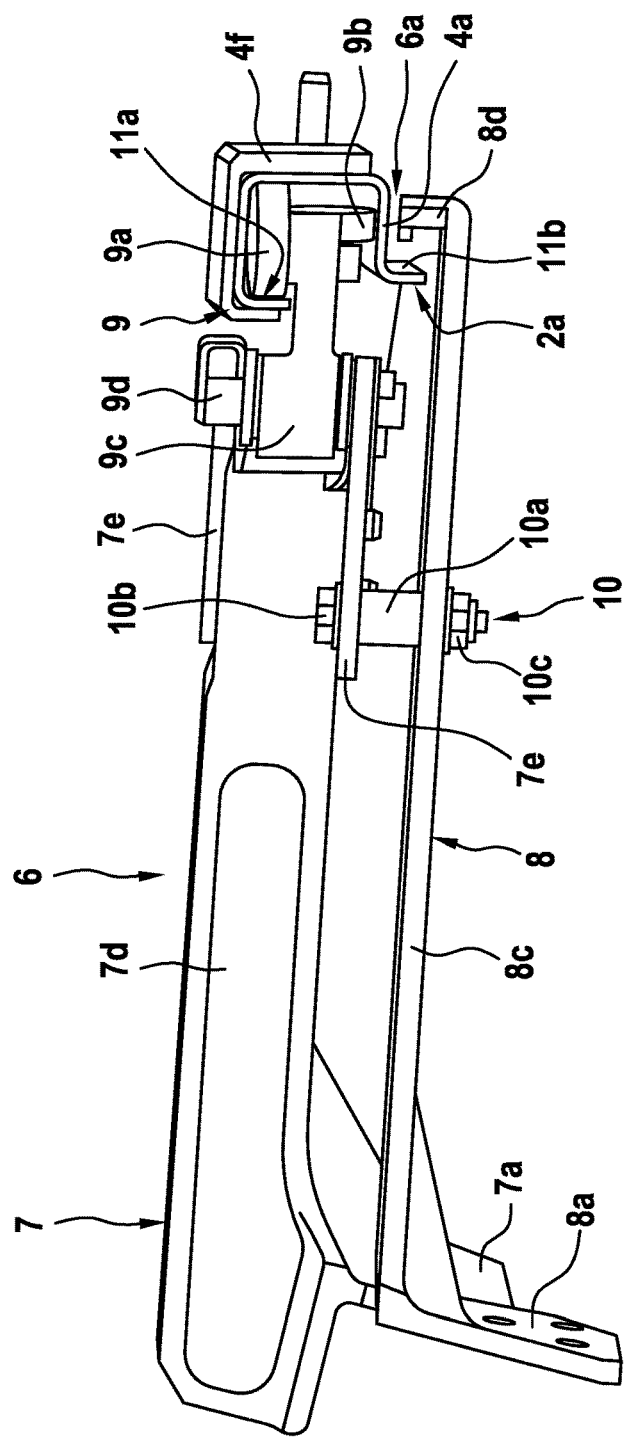
FIG. 5 shows the fail-safe sliding arm assembly of FIGS. 3 and 4, in a front plane view.

FIG. 5 shows the upper fail safe sliding arm assembly 6 of FIG. 4 with the safety arm 8 and the bogie support arm 7 that comprises the bogie assembly 9 with the guide roller mount 9c and the guide rollers 9a, 9b of FIG. 4. Illustratively, the bogie assembly 9 and, more specifically, the guide rollers 9a, 9b are positioned inside the accommodation 11a of the upper rail arrangement 2a of FIG. 3 and adapted for rolling in operation along the upper rail arrangement 2a.

Furthermore, a fastener 9d is shown that mounts the guide roller mount 9c to the connector beam 7d of the bogie support arm 7, i.e. to the upper and lower coupling plates 7e. The fastener 9d can be any suitable fastener, such as a screw, bolt, rivet and so on.

Moreover, the safety retainer blocking element 11b in the form of a fold is illustrated in greater detail, as well as the inventive positioning of the safety retainer 8d relative to this safety retainer blocking element 11b. Finally, the inventive arrangement of the fixation element 4f of FIG. 3 on an outer surface of the upper rail arrangement 2a is further illustrated.

In operation of the upper fail safe sliding arm assembly 6, the safety arm 8 retains the sliding door 5 of FIG. 2 to FIG. 4 on the upper rail arrangement 2a of FIG. 2 to FIG. 4 even in a case of failure of the bogie support arm 7. More specifically, if such a failure occurs e.g. at the connector beam 7d that, for instance, ruptures, the sliding door 5 of FIG. 2 to FIG. 4 continues to operate correctly, so that a sliding of the sliding door 5 of FIG. 2 to FIG. 4 along the upper rail arrangement 2a is still possible. This is enabled by the coupling of the bogie assembly 9 to the lower coupling plate 7e, which is in turn coupled to the connector beam 8c of the safety arm 8 via the coupling element 10, which thus serves as a bypass if the connector beam 7d of the bogie support arm 7 ruptures. If, however, a failure occurs e.g. at the guide roller mount 9c that, for instance, ruptures, the sliding door 5 of FIG. 2 to FIG. 4 does not operate correctly any more, but it is still retained at the upper rail arrangement 2a by means of the safety retainer 8d of the safety arm 8, so that any dangerous and potentially risky situation due to a loss of the sliding door 5 of FIG. 2 to FIG. 4 can be avoided.

Figure 6:
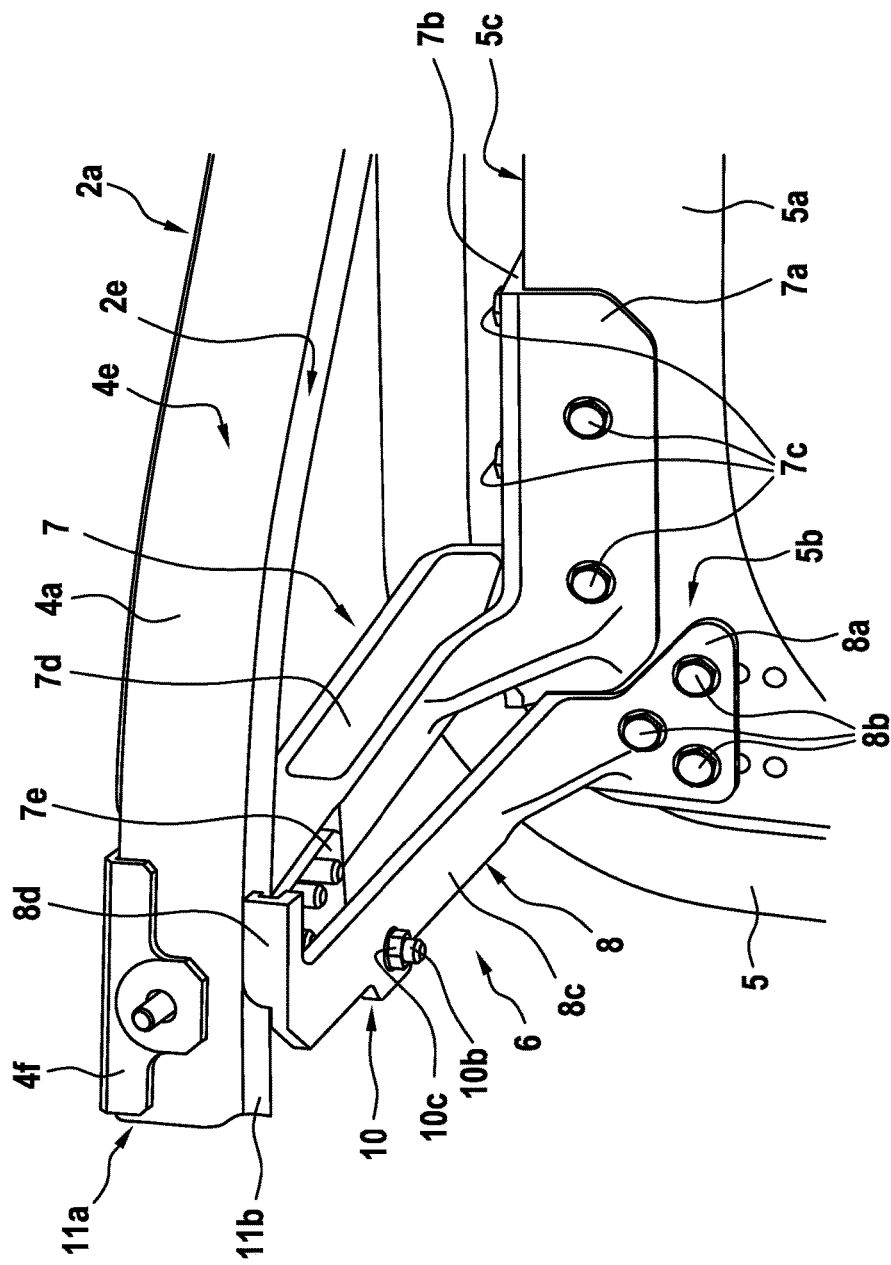
FIG. 6 shows the fail-safe sliding arm assembly of FIG. 2 in bottom view.

FIG. 6 shows the sliding door 5 of FIG. 3 with the upper fail safe sliding arm assembly 6 of FIG. 3, which comprises the safety arm 8 and the bogie support arm 7 of FIG. 3, in an upwards viewing direction. Thus, the rigid and removable mounting of the mounting plate 8a of the safety arm 8 and the mounting plates 7a, 7b of the bogie support arm 7 onto the door leaf 5a of the sliding door 5 are further illustrated, as well as the separate and independent mounting thereof, by means of the fasteners 8b and 7c.

Figure 7:
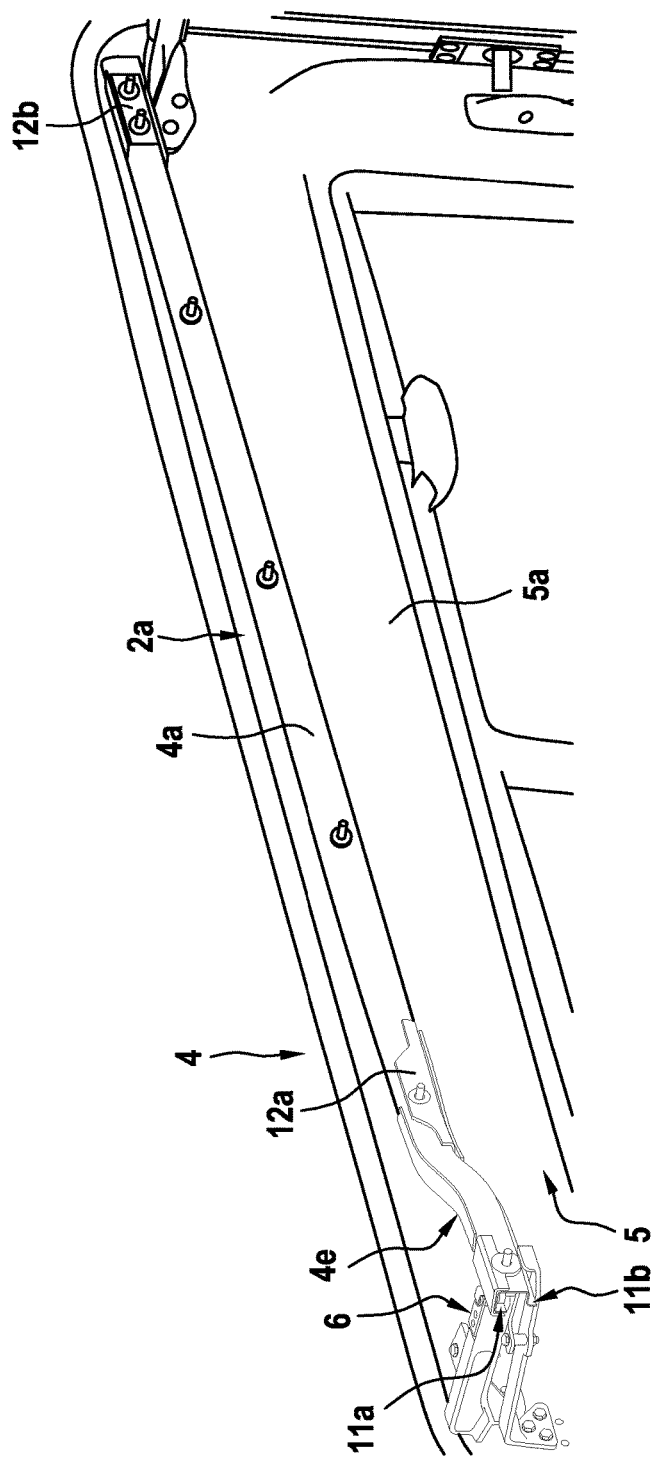
FIG. 7 shows the sliding closing element arrangement of FIG. 2 in enlarged view.

FIG. 7 shows an enlarged section of the sliding door 5 of FIG. 2 with the upper fail safe sliding arm assembly 6 of FIG. 2, which is slidably arranged on the upper rail front section 4a of the upper rail arrangement 2a of FIG. 1 and FIG. 2. The upper rail front section 4a illustratively comprises the rail mounting reinforcement 12a of FIG. 3 and a further rail mounting reinforcement 12b. This further rail mounting reinforcement 12b is preferably arranged in a region of the upper rail front section 4a, where the upper rail arrangement 2a migrates into the upper rail rear section 4c of FIG. 2.

Figure 8:
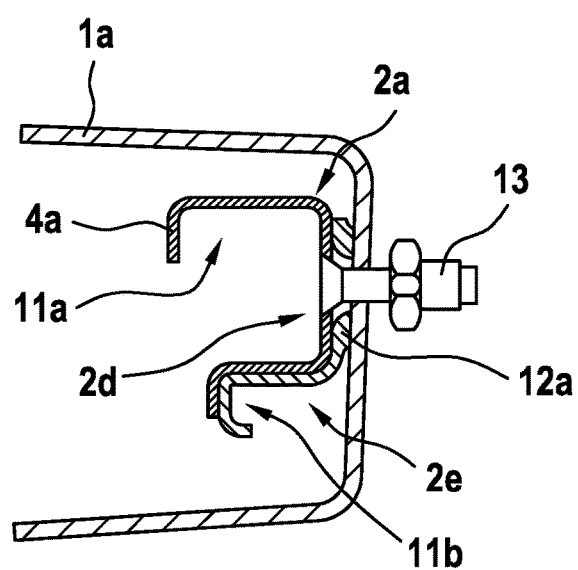
FIG. 8 shows a sectional view of a rail mounting reinforcement according to the present invention.

FIG. 8 shows a section of the fuselage 1a of the helicopter 1 of FIG. 1, to which the upper rail arrangement 2a of FIG. 3 is attached by means of suitable attachment means 13, such as screws, bolts, rivets and so on. More specifically, the upper rail front section 4a of the upper rail arrangement 2a is illustrated in the region of the rail mounting reinforcement 12a.

FIG. 8 further illustrates the contour respectively outer shape of the rail mounting reinforcement 12a that corresponds to the contour respectively outer shape of the upper rail front section 4a, such that the rail mounting reinforcement 12a encompasses the upper rail front section 4a at least partly like an outer skin thereof. Both, the rail mounting reinforcement 12a and the upper rail front section 4a are preferably traversed by the attachment means 13 for attachment to the fuselage 1a. Moreover, the accommodation 11a provided in the upper rail front section 4a and the safety retainer blocking element 11b provided on a lower longitudinal side thereof are further illustrated.

REFERENCE LIST 1 rotary wing aircraft
1a fuselage
1b tail boom
1c tail wing
1d fin
1e tail rotor shroud
1f board side wall
1g starboard side wall
1h side wall aperture 2 sliding door region
2a upper rail arrangement
2b lower rail arrangement
2c sliding door frame
2d upper rail outer longitudinal side
2e upper rail inner longitudinal side
3 viewing direction
4 sliding door arrangement
4a upper rail front section
4b lower rail front section
4c upper rail rear section
4d lower rail rear section
4e curved rail section
4f upper rail fixation element
5 starboard side sliding door
5a door leaf
5b door leaf inner surface
5c door leaf inner attachment ledge
6 fail safe sliding arm assembly
6a rail reception gap
7 bogie support arm
7a first bogie support arm mounting plate
7b second bogie support arm mounting plate
7c bogie support arm fasteners
7d bogie connector beam
7e bogie support arm coupling plate
8 safety arm
8a safety arm mounting plate
8b safety arm fasteners
8c safety arm connector beam
8d safety retainer
8e safety arm connector beam lateral extension
9 bogie assembly
9a horizontal guide rollers
9b vertical guide roller
9c guide roller mount
10 coupling element
10a spacer
10b fixation element
10c fixation means
11a upper rail bogie accommodation
11b upper rail front section safety retainer blocking element
12a first upper rail front section mounting reinforcement
12b second upper rail front section mounting reinforcement
13 attachment means

What is claimed is:

1. A sliding closing arrangement comprising:
at least one rail adapted for slidably supporting a closing element;
a fail safe sliding arm assembly comprising:
a bogie support arm;
a bogie assembly having at least one guide roller for rolling along
a safety arm defined by a connector beam having a mounting plate and a safety retainer extending perpendicularly from the connector beam, the mounting plate rigidly and removably attaching to the closing element with fasteners,
a rail reception gap defined between the bogie assembly and the safety retainer, the rail reception gap receiving the at least one rail;
wherein the safety arm retains the fail safe sliding arm assembly on the at least one rail in case of a failure of the bogie support arm.

2. The sliding closing element according to claim 1, wherein the at least one bogie assembly engages the at least one rail in a channel arranged on a first longitudinal side of the at least one rail.

3. The sliding closing element according to claim 2, wherein the at least one safety arm is adapted for abutting against a second longitudinal side of the at least one rail, the second longitudinal side opposing the first longitudinal side of the at least one rail.

4. The sliding dosing element according to claim 1, wherein the at least one safety retainer and the connector beam are implemented as an integrated, one-piece component.

5. The sliding closing element according to claim 1, wherein the mounting plate and the at least one connector beam enclose a predetermined angle being generally 90°.

6. The sliding closing element according to claim 1, wherein the at least one bogie support arm and the at least one safety arm are interconnected by a coupling element, the coupling element being adapted to allow a rotation between the at least one bogie support arm and the at least one safety arm in case of failure of the closing element.

7. The sliding closing element according to claim 6, wherein the at least one bogie support arm comprises at least one first connector beam and the at least one safety arm comprises at least one second connector beam, the at least one first and second connector beams being interconnected by means of the coupling element.

8. The sliding closing element according, to claim 7, wherein the associated coupling element comprises a spacer that defines a predetermined distance between the at least one first and second connector beams.

9. The sliding closing element according to claim 7, wherein the at least one first connector beam is provided with at least one coupling plate that is connected to the at least one second connector beam by means of the associated coupling element.

10. The sliding closing element according to claim 1, wherein the closing element comprises at least one of a sliding door or a sliding window.

11. A vehicle comprising a sliding closing element arrangement according to claim 1.

12. A sliding closing arrangement comprising:
a closing element slidable between closed and open positions;
least one rail adapted for slidably supporting the closing element between the closed and open positions, the at least one rail having a channel and a blocking element extending opposite the channel:
a bogie support arm attached to the closing element;
a guide roller assembly mounted to the bogie support arm adapted to roll along the channel for sliding the closing element between the closed and open positions; and
a safety arm mounted to the closing element and defined by a connector beam with a safety retainer extending from the connector beam;
wherein the safety retainer is adapted to abut the blocking element on the rail and thereby maintain operation of the guide roller assembly and sliding of the closing element along the rail in the event of failure of the bogie support arm.

13. The sliding closing arrangement of claim 12, wherein a gap is defined between the guide roller assembly and the safety arm, wherein the blocking element on the rail extends in the gap.

14. The sliding closing arrangement of claim 12, wherein the roller guide assembly is connected to the safety arm with a coupling element such that in case of failure of the bogie support arm, the guide roller assembly is connected to the closing element via the safety arm and the roller assembly continues to operate for sliding the closing element between the closed and open positions.

15. A sliding closing arrangement comprising:
   a rail slidably supporting a closing element; and
   a fail safe sliding arm assembly comprising:
      a bogie support arm attached to the closing element;
      a guide roller assembly rolling along the at least one rail sliding the closing element between closed and open positions; and
      a safety arm rigidly attached to the closing element and having a safety retainer extending from a distal. end of the safety arm,
   wherein in the event of a failure of the bogie support arm, the safety retainer on the safety arm abuts the rail to retain the sliding arm assembly on the at least one rail and maintain operation of the guide roller assembly and sliding of the closing element along the rail.

16. The sliding closing arrangement according to claim 15, wherein the guide roller assembly engages the rail in a channel arranged on a first longitudinal side of the rail.

17. The sliding closing element according to claim 16, wherein the safety retainer is adapted for abutting against a second longitudinal side of the rail opposing the first longitudinal side of the rail.

18. The sliding closing arrangement according to claim 15, wherein the safety arm comprises at least one connector beam, the safety retainer extending from the connector beam at a generally perpendicular mounting angle.

19. The sliding closing arrangement of claim 15, wherein a gap is defined between the guide roller assembly and the safety arm, the rail having a fold portion extending in the gap.

* * * * *